(12) United States Patent
Crangle et al.

(10) Patent No.: US 7,309,047 B2
(45) Date of Patent: Dec. 18, 2007

(54) SYSTEMS AND METHODS FOR CONTROLLING FLEXIBLE COMMUNICATION LINKS USED FOR AIRCRAFT REFUELING

(75) Inventors: Gage B. Crangle, Seattle, WA (US); Kim I. Doehring, Seattle, WA (US)

(73) Assignee: The Boeing Company, Chicago, IL (US)

( * ) Notice: Subject to any disclaimer, the term of this patent is extended or adjusted under 35 U.S.C. 154(b) by 100 days.

(21) Appl. No.: 11/067,331

(22) Filed: Feb. 25, 2005

(65) Prior Publication Data

US 2006/0192053 A1 Aug. 31, 2006

(51) Int. Cl.
*B64D 37/02* (2006.01)

(52) U.S. Cl. .................................. 244/135 R

(58) Field of Classification Search ............ 244/135 A, 244/135 R, 135 B, 135 C; 141/279; 239/171, 239/172, 175; 137/899.2, 355.16–355.24
See application file for complete search history.

(56) References Cited

U.S. PATENT DOCUMENTS

| 724,675 | A |  | 4/1903 | Decker |  |
|---|---|---|---|---|---|
| 2,091,916 | A |  | 8/1937 | Evans |  |
| 2,213,680 | A |  | 9/1940 | Barnett |  |
| 2,414,509 | A |  | 1/1947 | Andre |  |
| 2,453,553 | A |  | 11/1948 | Tansley |  |
| 2,475,635 | A |  | 7/1949 | Parsons |  |
| 2,552,991 | A |  | 5/1951 | McWhorter |  |
| 2,668,066 | A |  | 2/1954 | Stadelhofer |  |
| 2,670,913 | A | * | 3/1954 | Castor et al. | 244/135 R |
| 2,859,002 | A | * | 11/1958 | Leisy | 244/3 |
| 2,879,017 | A |  | 3/1959 | Smith |  |
| 2,919,937 | A |  | 1/1960 | Dovey |  |
| 2,953,332 | A | * | 9/1960 | Cobham et al. | 244/135 A |
| 2,960,295 | A | * | 11/1960 | Schulze | 244/135 A |

(Continued)

FOREIGN PATENT DOCUMENTS

DE 27 44 674 A1 4/1979

(Continued)

OTHER PUBLICATIONS

Thales Avionics Ltd., "Air Tanker Bids for Future Strategic Tanker Aircraft," Jul. 3, 2001; www.thalesavionics.net/press/pr43.html; (3pgs).

(Continued)

*Primary Examiner*—Timothy D. Collins
(74) *Attorney, Agent, or Firm*—Perkins Coie LLP (57) ABSTRACT

Systems and methods for controlling flexible communication links used for aircraft refueling are disclosed. A system in accordance with one aspect of the invention includes a support configured to be carried by an aerial refueling aircraft, and a motion control device carried by the support. A movable aerial refueling boom is positioned proximate to the support and carries an aerial refueling line. A flexible communication link is carried by the boom and is movable with the boom relative to the support. The flexible communication link is coupled to the motion control device wherein the motion control device limits relative motion between the flexible communication link and the support. In particular embodiments, the flexible communication link can include a hydraulic hose or a cable, and the motion control device can include a spring or other forcing member positioned to rotationally urge the flexible communication link toward the support.

25 Claims, 5 Drawing Sheets

U.S. PATENT DOCUMENTS

| | | | |
|---|---|---|---|
| 2,967,684 A | | 1/1961 | Knecht |
| 2,973,171 A * | | 2/1961 | Ward et al. ............. 244/135 A |
| 3,061,246 A * | | 10/1962 | Kirby ..................... 244/135 A |
| 3,067,972 A * | | 12/1962 | Mosher .................. 244/135 A |
| 3,680,311 A | | 8/1972 | Harbonn et al. |
| 3,747,873 A * | | 7/1973 | Layer et al. ..................... 244/3 |
| 3,836,117 A | | 9/1974 | Panicall |
| 3,917,196 A | | 11/1975 | Pond et al. |
| 3,928,903 A | | 12/1975 | Richardson et al. |
| 4,044,834 A | | 8/1977 | Perkins |
| 4,072,283 A * | | 2/1978 | Weiland ................. 244/135 A |
| 4,095,761 A * | | 6/1978 | Anderson et al. ....... 244/135 A |
| 4,119,294 A | | 10/1978 | Schnorrenberg |
| 4,129,270 A * | | 12/1978 | Robinson et al. ....... 244/135 A |
| 4,149,739 A | | 4/1979 | Morris |
| 4,150,803 A | | 4/1979 | Fernandez |
| 4,231,536 A * | | 11/1980 | Ishimitsu et al. ........ 244/135 A |
| 4,236,686 A | | 12/1980 | Barthelme et al. |
| 4,298,176 A * | | 11/1981 | Kendall .................. 244/135 A |
| 4,327,784 A * | | 5/1982 | Denniston ................... 141/387 |
| 4,408,943 A | | 10/1983 | McTamaney et al. .... 137/899.2 |
| 4,438,793 A * | | 3/1984 | Brown ........................ 141/382 |
| 4,471,809 A | | 9/1984 | Thomsen et al. |
| 4,477,040 A | | 10/1984 | Karanik |
| 4,534,384 A * | | 8/1985 | Graham et al. .......... 137/899.2 |
| 4,540,144 A * | | 9/1985 | Perrella .................. 244/135 A |
| 4,586,683 A * | | 5/1986 | Kerker ................... 244/135 A |
| 4,665,936 A | | 5/1987 | Furrer |
| H297 H | | 7/1987 | Schultz |
| 4,717,099 A | | 1/1988 | Hubbard |
| 4,796,838 A * | | 1/1989 | Yamamoto .............. 244/135 A |
| 4,883,102 A | | 11/1989 | Gabrielyan et al. |
| 4,929,000 A | | 5/1990 | Annestedt, Sr. |
| 5,131,438 A | | 7/1992 | Loucks |
| 5,141,178 A | | 8/1992 | Alden et al. |
| 5,255,877 A | | 10/1993 | Lindgren et al. |
| 5,326,052 A * | | 7/1994 | Krispin et al. .......... 244/135 A |
| 5,393,015 A | | 2/1995 | Piasecki |
| 5,427,333 A | | 6/1995 | Kirkland |
| 5,449,203 A | | 9/1995 | Sharp |
| 5,449,204 A | | 9/1995 | Greene et al. |
| 5,499,784 A * | | 3/1996 | Crabere et al. ......... 244/135 A |
| 5,530,650 A | | 6/1996 | Biferno et al. |
| 5,539,624 A | | 7/1996 | Dougherty |
| 5,573,206 A | | 11/1996 | Ward |
| 5,785,276 A | | 7/1998 | Ruzicka |
| 5,810,292 A | | 9/1998 | Garcia, Jr. et al. |
| 5,904,729 A | | 5/1999 | Ruzicka |
| 5,906,336 A * | | 5/1999 | Eckstein ................. 244/135 A |
| 5,921,294 A | | 7/1999 | Greenhalgh et al. |
| 5,996,939 A | | 12/1999 | Higgs et al. |
| 6,076,555 A | | 6/2000 | Hettinger |
| 6,119,981 A | | 9/2000 | Young et al. |
| 6,145,788 A | | 11/2000 | Mouskis et al. |
| 6,302,448 B1 | | 10/2001 | Van Der Meer et al. |
| 6,305,336 B1 | | 10/2001 | Hara et al. |
| 6,324,295 B1 | | 11/2001 | Valery et al. |
| 6,326,873 B1 | | 12/2001 | Faria |
| 6,375,123 B1 | | 4/2002 | Greenhalgh et al. |
| 6,428,054 B1 | | 8/2002 | Zappa et al. |
| 6,454,212 B1 | | 9/2002 | Bartov |
| 6,464,173 B1 | | 10/2002 | Bandak |
| 6,467,725 B1 | | 10/2002 | Coles et al. |
| 6,588,465 B1 | | 7/2003 | Kirkland et al. |
| 6,598,830 B1 | | 7/2003 | Ambrose et al. |
| 6,601,800 B2 | | 8/2003 | Ollar |
| 6,604,711 B1 * | | 8/2003 | Stevens et al. ......... 244/135 A |
| 6,651,933 B1 * | | 11/2003 | von Thal et al. ........... 244/136 |
| 6,669,145 B1 | | 12/2003 | Green |
| 6,676,379 B2 | | 1/2004 | Eccles et al. |
| 6,752,357 B2 | | 6/2004 | Thal et al. |
| 6,779,758 B2 * | | 8/2004 | Vu et al. ................. 244/135 A |
| 6,786,455 B1 * | | 9/2004 | Bartov ................... 244/135 A |
| 6,796,527 B1 | | 9/2004 | Munoz et al. |
| 6,819,982 B2 | | 11/2004 | Doane |
| 6,824,105 B2 | | 11/2004 | Edwards et al. |
| 6,832,743 B2 | | 12/2004 | Schneider et al. |
| 6,837,462 B2 * | | 1/2005 | von Thal et al. ........ 244/135 A |
| 6,848,720 B2 | | 2/2005 | Carns et al. |
| 6,966,525 B1 * | | 11/2005 | Schroeder ............... 244/135 A |
| 2003/0038214 A1 | | 2/2003 | Bartov |
| 2003/0097658 A1 | | 5/2003 | Richards |
| 2003/0115863 A1 | | 6/2003 | Holt et al. |
| 2003/0136874 A1 | | 7/2003 | Gjerdrum |
| 2003/0205643 A1* | | 11/2003 | von Thal et al. ........ 244/135 A |
| 2003/0218097 A1* | | 11/2003 | Vu et al. ................. 244/135 A |
| 2004/0069904 A1* | | 4/2004 | Thal et al. .............. 244/135 A |
| 2004/0129865 A1 | | 7/2004 | Doane |
| 2004/0195909 A1 | | 10/2004 | Hamzeh et al. |
| 2005/0055143 A1 | | 3/2005 | Doane |
| 2006/0000949 A1 | | 1/2006 | Schroeder |
| 2006/0011782 A1 | | 1/2006 | Schroeder |
| 2006/0038076 A1 | | 2/2006 | Schroeder |
| 2006/0071475 A1 | | 4/2006 | James et al. |
| 2006/0214059 A1 | | 9/2006 | Smith |

FOREIGN PATENT DOCUMENTS

| | | |
|---|---|---|
| DE | 29901583 | 5/1999 |
| DE | 10013751 | 10/2001 |
| EP | 0236584 | 9/1987 |
| EP | 0807577 | 11/1997 |
| EP | 1094001 | 4/2001 |
| EP | 1361156 | 11/2003 |
| EP | 1695911 | 8/2006 |
| GB | 555984 | 9/1943 |
| GB | 2257458 | 1/1993 |
| GB | 2373488 | 9/2002 |
| GB | 2 405 384 | 3/2005 |
| IT | 128459 | 5/2003 |
| RU | 2111154 | 5/1998 |
| RU | 2140381 | 10/1999 |
| RU | 2142897 | 12/1999 |
| SU | 673798 | 7/1979 |
| SU | 953345 | 8/1982 |
| TW | 386966 | 4/2000 |
| WO | WO-85/02003 | 5/1985 |
| WO | WO-91/06471 | 5/1991 |
| WO | WO-97/33792 | 9/1997 |
| WO | WO-98/07623 | 2/1998 |
| WO | WO-98/39208 | 9/1998 |
| WO | WO-98/54053 | 12/1998 |
| WO | WO-02/24529 | 3/2002 |
| WO | WO-02/055385 | 7/2002 |
| WO | WO-02/76826 | 10/2002 |
| WO | WO-03/102509 | 12/2003 |

OTHER PUBLICATIONS

Flug Revue, "Airbus (Air Tanker) A330-200 Tanker," Jan. 26, 2004; www.flug-revue.rotor.com/FRTypen/FRA3302T.htm; MotorpPress Stuttgart, Bonn, German, (5 pgs).

Keller, George R., "Hydraulic System Analysis", pp. 40-41, 1985, Hydraulics & Pheumatics, Cleveland, Ohio.

* cited by examiner

SYSTEMS AND METHODS FOR CONTROLLING FLEXIBLE COMMUNICATION LINKS USED FOR AIRCRAFT REFUELING

TECHNICAL FIELD

The present invention is directed generally toward systems and methods for controlling flexible communication links, for example, communication links used for aircraft refueling.

BACKGROUND

In-flight refueling (or air-to-air refueling) is an important method for extending the range of aircraft traveling long distances over areas having no feasible landing or refueling points. Although in-flight refueling is a relatively common operation, especially for military aircraft, the aircraft to be refueled (e.g., the receiver aircraft) must be precisely positioned relative to the tanker aircraft in order to provide a safe engagement while the fuel is dispensed to the receiver aircraft. The requirement for precise relative spatial positioning of the two rapidly moving aircraft makes in-flight refueling a challenging operation.

The are currently two primary systems for in-flight refueling. One is a probe and drogue system in which a refueling hose having a drogue disposed at one end is trailed behind the tanker aircraft and is engaged by the receiver aircraft. Another system is a boom refueling system. The boom refueling system typically includes a rigid boom extending from the tanker aircraft, with a nozzle at its distal end. The boom also includes airfoils controlled by a boom operator stationed on the refueling aircraft. The airfoils allow the operator to maneuver the boom with respect to the receiver aircraft. Accordingly, the receiver aircraft is first maneuvered into an in-flight refueling position below and aft of the tanker aircraft. The boom operator then controls the airfoils to position the boom and mate the refueling nozzle with a refueling connection on the receiver aircraft.

In order to accommodate the inevitable relative motion between the tanker aircraft and the receiver aircraft, the refueling boom must be movable, both vertically and laterally. Accordingly, the refueling boom and associated supply lines (e.g., electrical supply lines and hydraulic lines) must be configured to accommodate this relative motion. In particular, hydraulic fluid is typically used to move the boom airfoil surfaces, and accordingly must be provided to the boom from the fixed reference point of the aircraft to the moving boom. One existing method for accommodating this relative movement is to provide a relatively large degree of "slack" in the hydraulic lines, which allows them to flex and bend as the boom moves relative to the aircraft. One potential drawback with the foregoing approach is that the volume required by the boom as a result of the increased volume occupied by the lengthy hydraulic lines is increased. Because the boom is positioned external to the aircraft, the increased volume can increase the drag of the aircraft. The increased drag increases the cost of flying the aircraft. Furthermore, the lengthy hoses can become cumbersome during operations.

SUMMARY

The following summary is provided for the benefit of the reader only, and does not limit the invention as set forth by the claims. An aerial refueling system in accordance with one aspect of the invention includes a support configured to be carried by an aerial refueling aircraft, and a motion control device carried by the support. A movable aerial refueling boom is positioned proximate to the support, with the boom carrying an aerial refueling line. A flexible communication link is carried by the boom and is movable with the boom relative to the support. The flexible communication link can be coupled to the motion control device, with the motion control device limiting relative motion between the flexible communication link and the support.

The flexible communication link can include a hydraulic hose, or a link configured to transmit electromagnetic signals (e.g., an electrical cable, fiber optic link, or other communication link). The motion control device can, in one aspect of the invention, include a generally rigid first conduit that is pivotable relative to the support about a generally vertical pivot axis. The motion control device can further include a generally rigid second conduit coupled to the first conduit to pivot with the first conduit, and can extend outwardly from the first conduit. The flexible communication link can be attached to the second conduit. A spring can be coupled between the second conduit and the support to rotationally urge the second conduit toward the support about the generally vertical pivot access.

A method in accordance for another aspect of the invention is directed to operation of an aerial refueling system. The method can include moving an aerial refueling boom carried by an aerial refueling aircraft relative to the aerial refueling aircraft. The method can further include moving a flexible communication link carried by the boom along with the boom as the boom moves relative to the aircraft. The motion of the flexible communication link relative to the aircraft can be controlled by applying a force on the flexible communication link to at least restrict contact between the flexible communication link and fixed portions of the aircraft and/or the boom.

DETAILED DESCRIPTION

Figure 1:
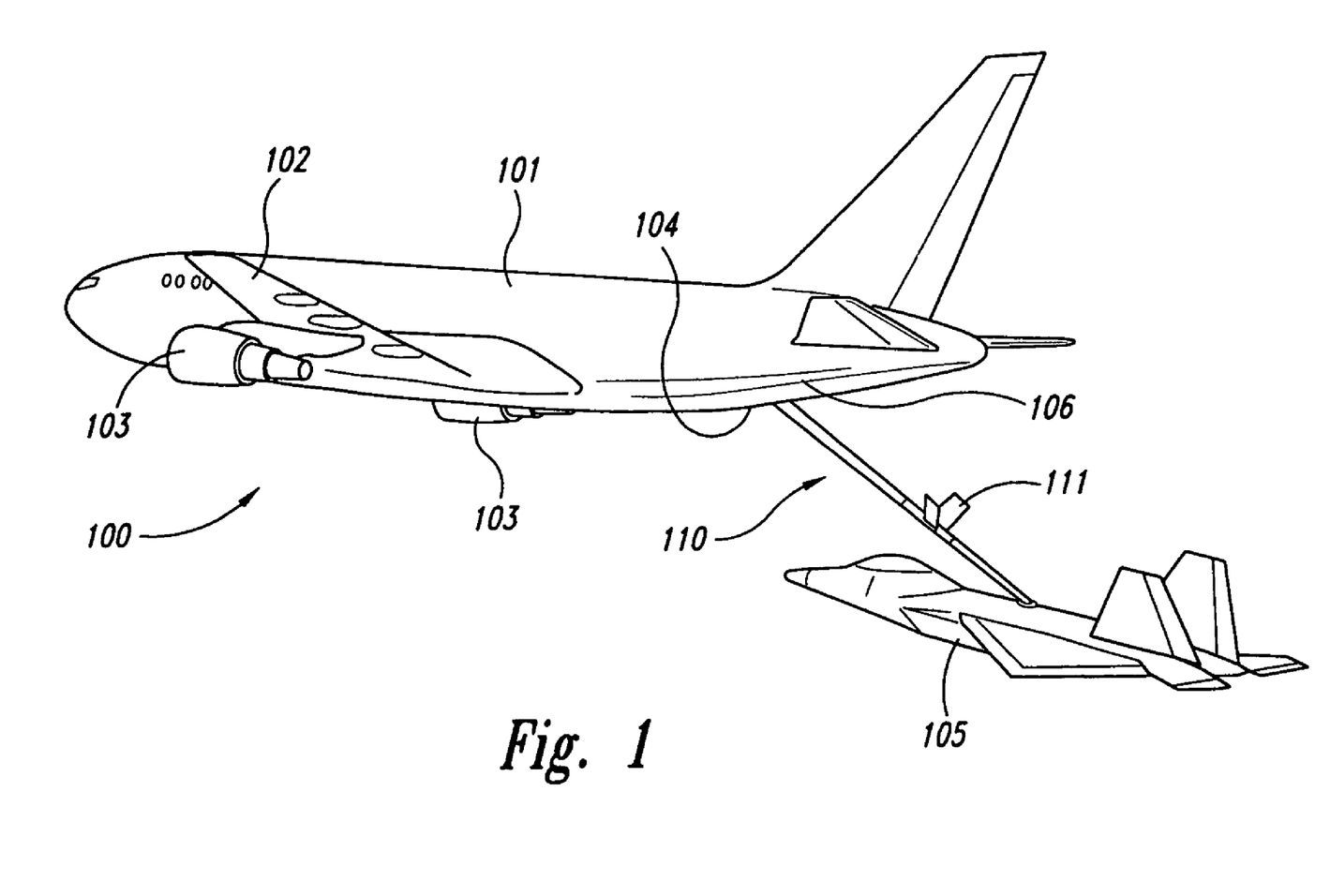
FIG. 1 is an isometric illustration of a tanker aircraft refueling a receiver aircraft with a refueling boom configured in accordance with an embodiment of the invention.

The present disclosure describes systems and methods for controlling flexible communication links (for example, hydraulic hoses and electrical cables) used for aircraft refueling. Certain specific details are set forth in the following description and in FIGS. 1–4 to provide a thorough understanding of various embodiments of the invention. Well-known structures, systems, and methods often associated with these systems have not been shown or described in detail to avoid unnecessarily obscuring the description of the various embodiments of the invention. In addition, those of ordinary skill in the relevant art will understand that addi- FIG. 1 illustrates a tanker aircraft 100 refueling a receiver aircraft 105 with a refueling boom 110 configured in accordance with an embodiment of the invention. The tanker aircraft 100 has a fuselage 101, wings 102, and one or more engines 103 (two are shown in FIG. 1 as being carried by the wings 102). In other embodiments, the aircraft 100 can have other configurations. In a particular aspect of the embodiment shown in FIG. 1, the fuselage 101 has an external surface 106 through which the refueling boom 110 projects. Airfoils 111 are used by a boom operator within the aircraft 100 to steer the boom 110. An aerodynamic fairing 104 provides for a smooth flow of freestream air at the junction between the boom 110 and the fuselage external surface 106. As discussed below, certain aspects of the refueling boom 110 and its integration with the aircraft 100 can increase the ease with which the boom 110 is operated, and/or reduce the size of the fairing 104. The smaller fairing 104 can reduce the overall aircraft drag and therefore the costs for operating the tanker aircraft 100.

Figure 2:
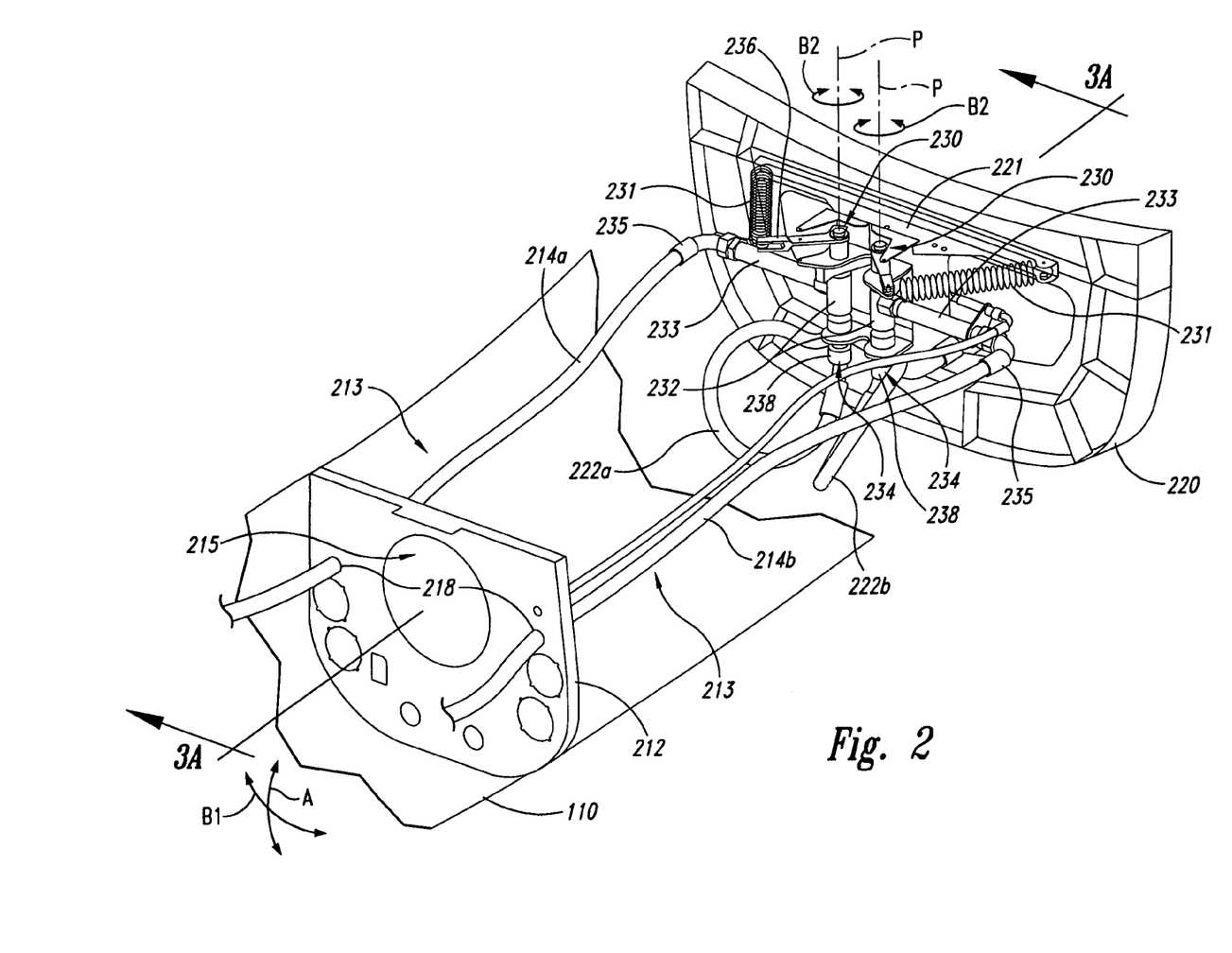
FIG. 2 is a partially schematic, isometric illustration of an internal portion of the boom, which includes a motion control device configured in accordance with an embodiment of the invention.

FIG. 2 is an isometric illustration of a portion of the refueling boom 110 and its connection to the tanker aircraft 100 (FIG. 1), with the fairing 104 removed for purposes of illustration. The refueling boom 110 can include a boom bulkhead 212 having a fuel hose aperture 215 that supports a fuel hose used during aerial refueling operations. The boom bulkhead 212 can include other apertures for carrying other communication links as described in greater detail below. The refueling boom 110 (including the boom bulkhead 212) is movable relative to a fixed bulkhead 220 so as to position the refueling boom 110 before, during and after refueling operations. Accordingly, the refueling boom 110 can rotate relative to the fixed bulkhead 220 in a generally vertical direction (as indicated by arrow A) and in a generally lateral direction (as indicated by arrow B1).

The refueling boom 110 can include one or more flexible communication links 213 that provide for communication between the tanker aircraft 100 and the refueling boom 110, and which can flex with the motion of the refueling boom 110 as the refueling boom 110 moves relative to the aircraft. One or more motion control devices 230 (two are shown in FIG. 2) can be coupled between the fixed bulkhead 220 and the boom bulkhead 212 to facilitate unhampered movement of the refueling boom 110. Further details of the flexible communication links 213 and the motion control devices 230 are described below.

In one embodiment, the flexible communication links 213 can include hydraulic hoses. In other embodiments, the flexible communication links 213 can include other types of links, for example, electrical cables, optical cables, or other conduits for transmitting electromagnetic, fluid, mechanical or other signals. In a particular embodiment shown in FIG. 2, each flexible communication link 213 can include a hydraulic hose 214, shown in FIG. 2 as a hydraulic supply hose 214a (that supplies hydraulic fluid to the refueling boom 110) and a hydraulic return hose 214b (that returns hydraulic fluid from the refueling boom 110 to the tanker aircraft). The hydraulic hoses 214 can be flexible enough to bend as the refueling boom 110 moves. For example, the hydraulic hoses 214 may be flexible enough so as to be unable to support their own weight without drooping, when cantilevered horizontally. Each hydraulic hose 214a, 214b is carried by a corresponding hose aperture 218 in the boom bulkhead 212. Each hydraulic hose 214a, 214b is also coupled to a corresponding motion control device 230, as described below.

Each motion control device 230 can include a first coupling site 234 and a second coupling site 235. The second coupling site 235 can be connected to one of the hydraulic hoses 214, and the first coupling site 234 can be coupled to the tanker aircraft. For example, one of the first coupling sites 234 can be coupled to an aircraft supply hose 222a which provides hydraulic fluid to the boom supply hose 214a from a hydraulic system located on the refueling aircraft. The other first coupling site 234 can be coupled to an aircraft return hose 222b which returns the hydraulic fluid to the refueling aircraft.

The motion control devices 230 can each be pivotable about a pivot axis P (as indicated by arrows B2) to accommodate the relative lateral rotational motion of the refueling boom 110 (indicated by arrow B1). Accordingly, each motion control device 230 can include a first conduit (or conduit portion) 232 having the first coupling site 234, and a second conduit (or conduit portion) 233 having the second coupling site 235. The first and second conduit portions 232, 233 can be generally rigid and can be generally rigidly coupled to each other so as to pivot as a unit about the pivot axis P. The conduit portions 232, 233 can initially be separate units that are bonded to each other, or the conduit portions 232, 233 can be formed integrally with each other. Each motion control device 230 can also be carried by a support 221 that is in turn carried by the fixed bulkhead 220. As the refueling boom 110 rotates laterally relative to the support 221 (as indicated by arrow B1), each second coupling site 235 follows or otherwise tracks this motion by rotating about the corresponding pivot axis P, as indicated by arrows B2. Hydraulic pivots 238 can be provided at each first coupling site 234 to allow the first and second conduits 232, 233 to pivot relative to the aircraft hoses 222a, 222b. Suitable hydraulic pivots 238 are available Aeroquip of Maumee, Ohio. In other embodiments, the hydraulic pivots 238 can have other configurations, and/or can provide coupling for other types of communication (e.g., electrical or optical).

Each motion control device 230 can further include a forcing member 231 that applies a force to the flexible communication links 213. For example, each forcing member 231 can include a spring that tends to rotate the second conduit portion 233 toward the fixed bulkhead 220. The spring can accordingly be connected between the fixed bulkhead 220 (or the support 221) and a corresponding spring arm 236 that rotates with the motion control device 230. Accordingly, the forcing members 231 can automatically take up slack in the flexible communication links 213 as the refueling boom 110 rotates from side to side.

Figure 3A:
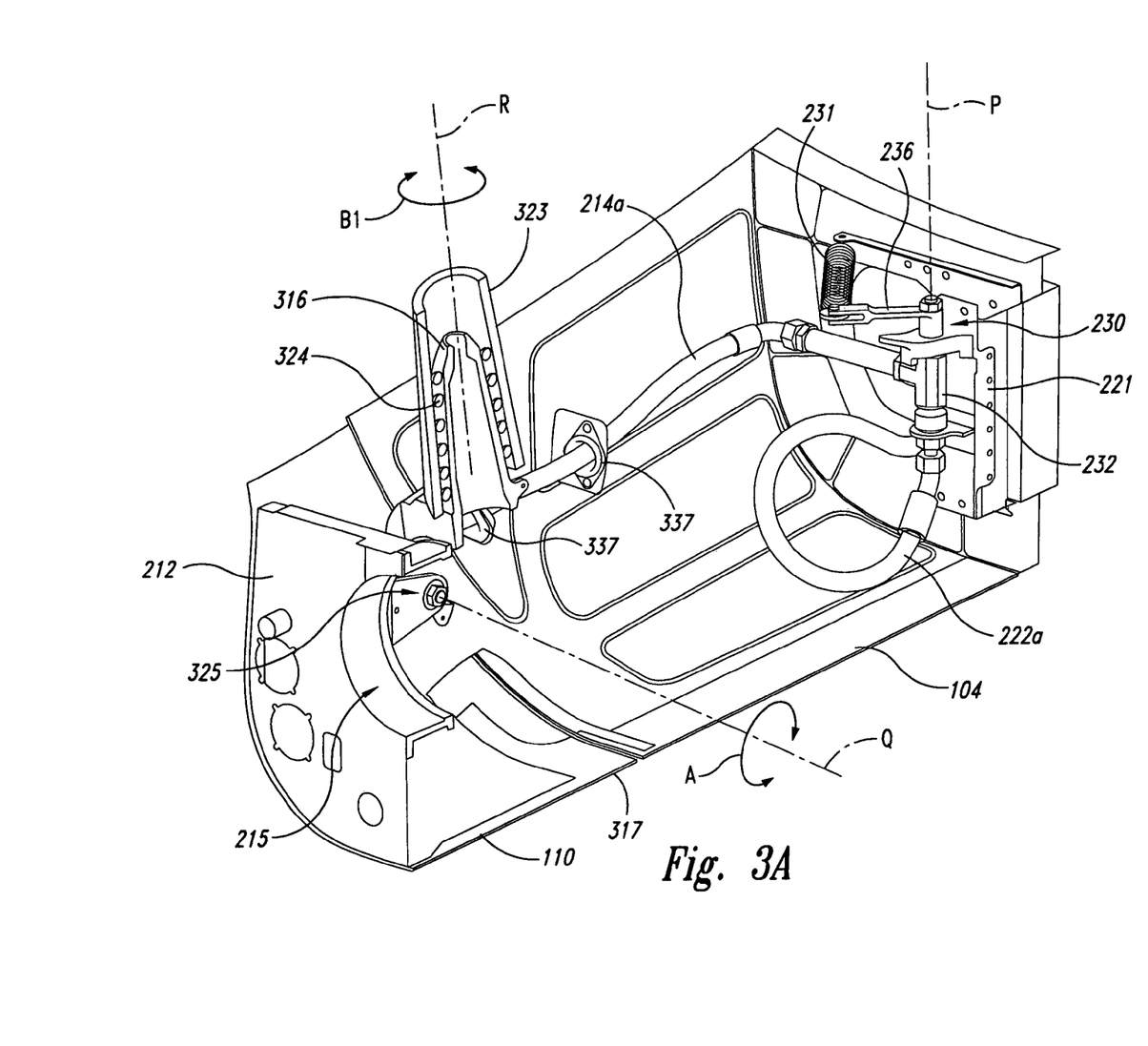
FIGS. 3A and 3B are cut-away isometric and side views, respectively, of an embodiment of the refueling boom and motion control device shown in FIG. 2.
Figure 3B:
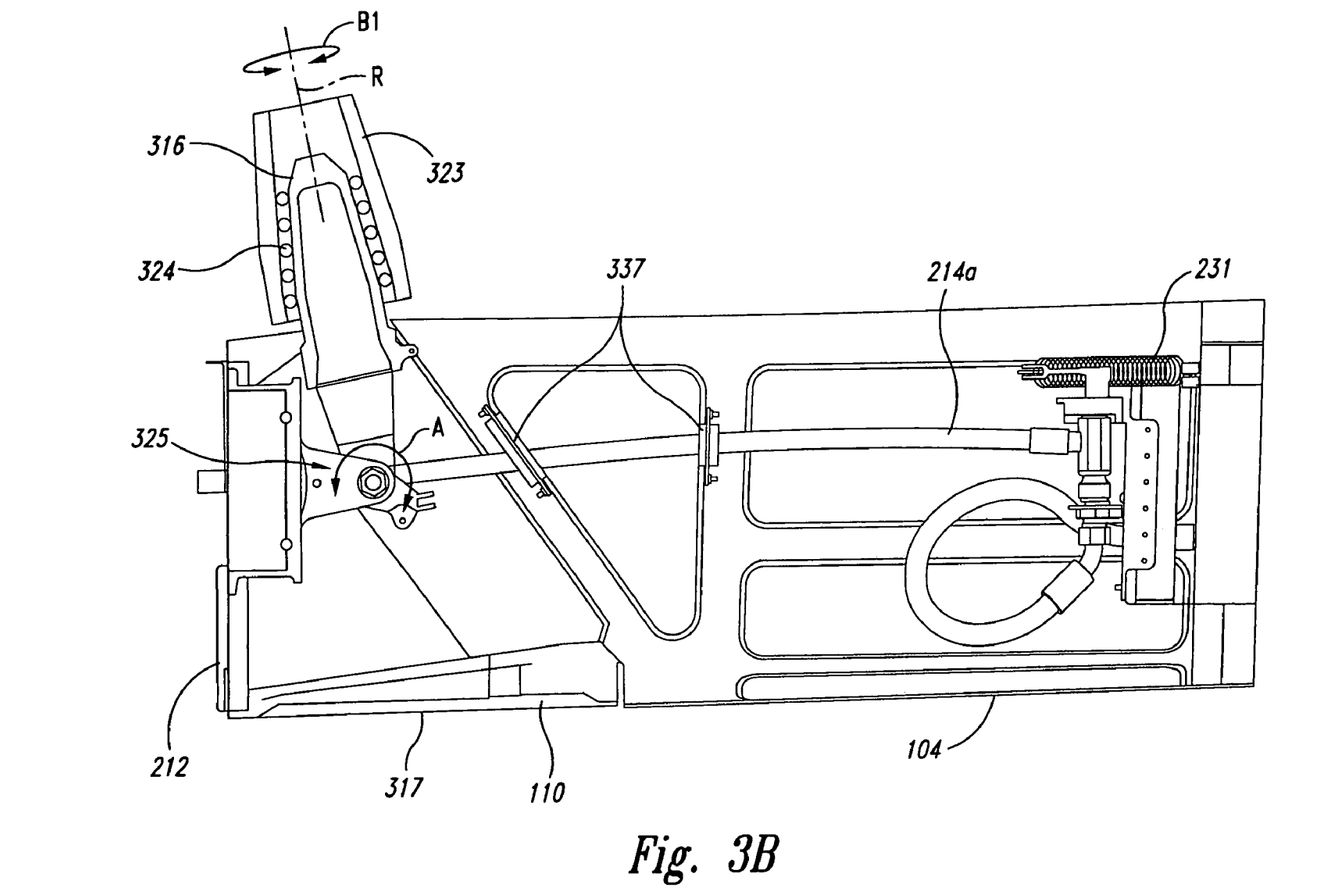

FIG. 3A is a cut-away isometric view of the refueling boom 110, taken generally along lines 3A—3A of FIG. 2. FIG. 3B is a side view of the cut-away portion shown in FIG. 3A. FIGS. 3A and 3B together illustrate further details of the pivoting arrangement for the refueling boom 110, along with the external skin of both the boom 110 and the fairing 104. The boom 110 includes a boom external skin 317 positioned adjacent to a trailing edge of the fairing 104. The boom external skin 317 is positioned so that the boom 110 can rotate relative to the fairing 104 without interference between the boom skin 317 and the fairing 104. The boom 110 includes a boom pivot 316 that is attached to the boom bulkhead 212 and is received within a fixed pivot receptacle 323. A bearing 324 between the boom pivot 316 and the pivot receptacle 323 allows the boom 110 to rotate smoothly about a lateral motion axis R (as indicated by arrow B1). The boom bulkhead 212 is pivotably coupled to the boom pivot 316 at a vertical motion joint 325 so as to rotate about a vertical pivot axis Q as indicated by arrow A. One or more guides 337 can be positioned adjacent to the communication link 213 to supplement the guiding force provided by the motion control device 230.

One feature of an embodiment of the refueling arrangement described above with reference to FIGS. 1–3B is that the motion control devices 230 can control the motion of the hydraulic supply hose 214a and the hydraulic return hose 214b, and/or other flexible communication links 213 (e.g., electrical cables or other cables). For example, the forcing members 231 can allow the flexible communication links 213 to rotate in at least two directions (e.g., two opposing lateral directions) to accommodate the motion of the refueling boom 110. An advantage of this arrangement is that the flexible communication links 213 need not include a significant amount of slack or excess length to accommodate this relative motion. As a result, the weight of the flexible communication links 213 can be reduced, and the likelihood for the flexible communication links 213 to contact and/or interfere with other structures in the boom 110, or to be contacted and/or interfered with by such other structures can be reduced.

Another advantage of the foregoing arrangement is that the fairing 104 need not be sized to accommodate a large amount of slack or excess length of the communication links 213. Instead, the fairing 104 can have a reduced size relative to existing fairings because the motion of the communication links 213 is controlled by the motion control device 230. Therefore, the weight of the fairing 104 can be reduced and the drag caused by the fairing 104 can also be reduced. Both of these effects can reduce the overall costs for operating the refueling tanker 100.

Another feature of embodiments of the system described above is that the forcing member 231 need not be attached directly to the flexible communication link 213 in order to urge the flexible communication link 213 toward the support 221. Instead, the forcing member 231 can be attached to the spring arm 236, which in turn imparts a pivoting force to the flexible communication link. Accordingly, the forcing member 231 can be operatively coupled to the flexible communication link 231 (and, in some embodiments, to the second conduit 233) via the spring arm 236. An advantage of this arrangement is that the forcing member 231 can indirectly apply a significant force on the flexible communication link 213 without requiring that flexible communication link 213 withstand such a force directly. Accordingly, the system can include readily available flexible communication links 213, rather than specially reinforced links.

Figure 4:
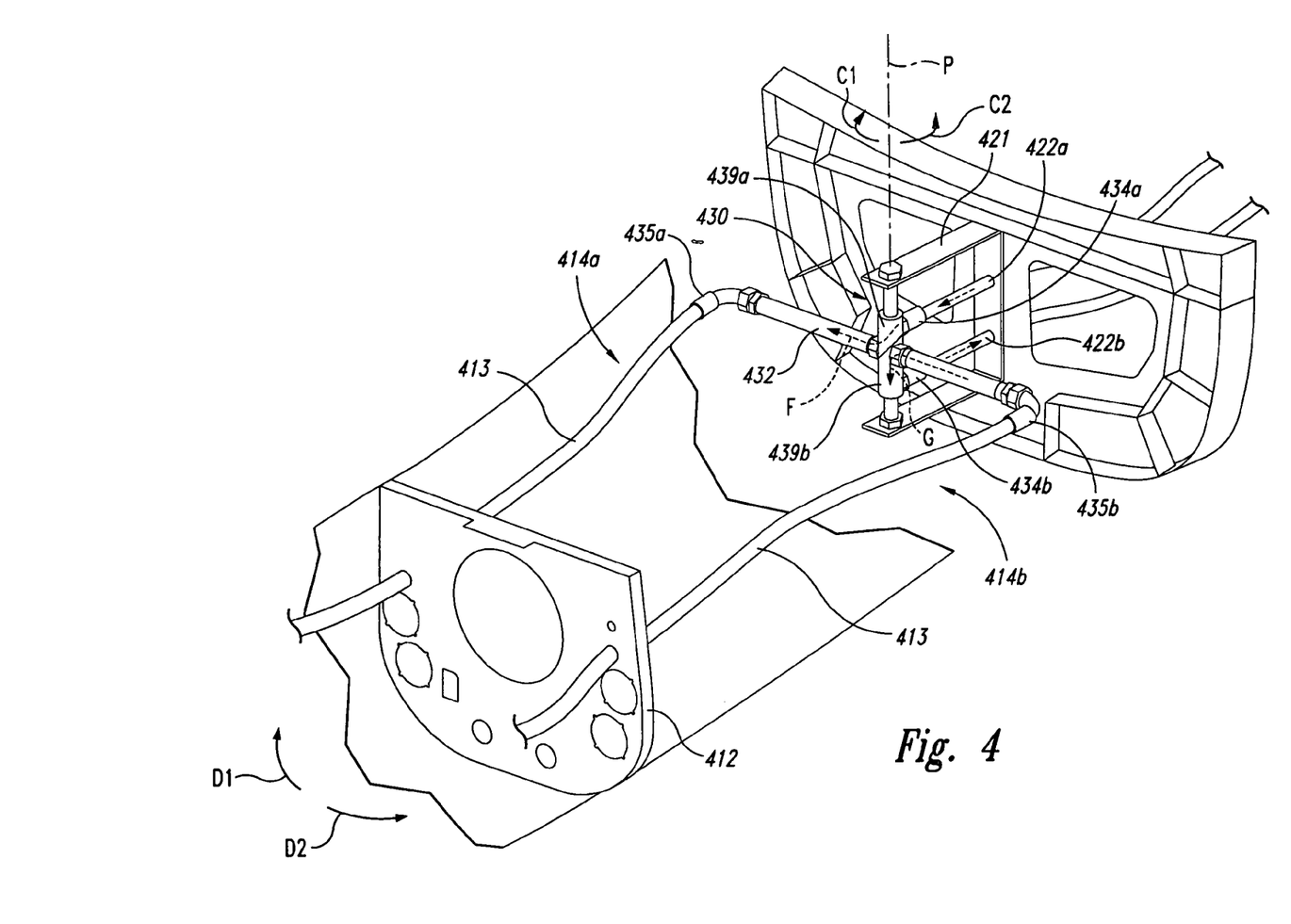
FIG. 4 is a partially schematic, isometric illustration of a motion control device and boom portion configured in accordance with another embodiment of the invention.

In other embodiments, the motion control device can have other arrangements. For example, FIG. 4 illustrates a motion control device 430 that also controls the motion of two flexible communication links 413 (e.g., a boom supply hose 414a and a boom return hose 414b) in a manner somewhat different than that described above with reference to FIGS. 1–3B. The motion control device 430 can include a support 421 carrying a generally rigid conduit 432. The conduit 432 is pivotable relative to the support 421 about a pivot axis P so as to rotate laterally, as indicated by arrows C1 and C2. The conduit 432 can include two first coupling sites 434a, 434b, each coupled to a corresponding aircraft hose 422a, 422b. The conduit 432 can also include two second coupling sites 435a, 435b, each connected to one of the hoses 414a, 414b. The conduit 432 can have two portions, one of which includes a first channel 439a that directs incoming hydraulic fluid from an aircraft supply hose 422a to the boom supply hose 414a, as indicated by arrow F. Another portion of the conduit 432 includes a second channel 439b that returns spent hydraulic fluid from the boom return hose 414b to the aircraft return hose 422b, as indicated by arrow G. The refueling boom 110 can include a boom bulkhead 412 generally similar to the boom bulkhead 212 described above. As the boom bulkhead 412 rotates in direction D1, it applies a tension to the boom return hose 414b, which in turn rotates the conduit 432 clockwise about the pivot axis P (as indicated by arrow C1). The clockwise rotation of the conduit 432 applies a tension to the boom supply hose 414a, preventing the supply hose 414a from developing a large amount of slack. When the refueling boom 110 rotates in the opposite direction (as indicated by arrow D2), the boom 412 applies a tension to the boom supply hose 414a, which in turn rotates the conduit 432 counterclockwise about the pivot axis P (as indicated by arrow C2) and applies a tension to the boom return hose 414b. In this manner, the motion control device 430 can control the motion of both flexible communication links 413 in two opposing pivot directions.

From the foregoing, it will be appreciated that specific embodiments of the invention have been described herein for purposes of illustration, but that various modifications may be made without deviating from the invention. For example, aspects of the invention described in the context of particular embodiments may be combined or eliminated in other embodiments. In still further embodiments, aspects of the invention can have arrangements other than those specifically described above. For example, the tanker aircraft 100 can have configurations other than the configuration shown in FIG. 1. The forcing member 231 can have a configuration other than a spring (e.g., it can include a pneumatic or hydraulic cylinder) or it can be eliminated entirely, as described above and shown in FIG. 4. In still further embodiments, the forcing member 231 can apply a tension directly to the flexible communication link, provided that the flexible communication link is configured to withstand such a direct application of force. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An aerial refueling system, comprising:
    a support configured to be carried by an aerial refueling aircraft;
    a motion control device carried by the support and including a passage for receiving hydraulic fluid;
    a movable aerial refueling boom positioned proximate to the support, the boom carrying an aerial refueling line; and
    a flexible communication link carried by the boom and movable with the boom relative to the support, the flexible communication link including a hydraulic hose and being coupled to the motion control device, wherein the motion control device limits relative motion between the flexible communication link and the support.

2. The system of claim 1 wherein the flexible communication link includes a flexible hydraulic hose, and wherein the motion control device includes:
    a generally rigid first conduit portion pivotable relative to the support about a generally vertical pivot axis, the first conduit portion having a first coupling site that includes a hydraulic pivot;

a generally rigid second conduit portion coupled to the first conduit portion to pivot with the first conduit, the second conduit extending outwardly from the first conduit portion and having a second coupling site to which the flexible communication link is coupled; and a spring operatively coupled between the second conduit portion and the support to rotationally urge the second conduit portion toward the support about the generally vertical pivot axis.

3. The system of claim 2 wherein the motion control device includes a spring arm attached to at least one of the conduit portions to pivot about the pivot axis, and wherein the spring is coupled between the support and the spring arm.

4. The system of claim 1 wherein the flexible communication link includes a first flexible hydraulic hose and a second flexible hydraulic hose, and wherein the motion control device is one of two motion control devices, with each motion control device including:

a first generally rigid conduit portion pivotable relative to the support about a generally vertical pivot axis, the first conduit portion having a first coupling site that includes a hydraulic pivot;

a second generally rigid conduit portion coupled to the first conduit portion to pivot with the first conduit portion, the second conduit portion extending outwardly from the first conduit portion and having a second coupling site at which one of the flexible hydraulic hoses is coupled; and a spring operatively coupled between the second conduit portion and the support to rotationally urge the second conduit portion toward the support about the pivot axis, wherein each spring urges the respective second conduit portion in opposite directions about the respective pivot axis.

5. The system of claim 1, further comprising a fairing configured to be positioned external to an aircraft fuselage, the fairing housing the motion control device and at least a portion of the flexible communication link.

6. The system of claim 1 wherein the flexible communication link is configured to transmit electromagnetic signals.

7. The system of claim 1 wherein the motion control device includes a generally rigid conduit that is pivotable relative to the support about a pivot axis, and wherein the conduit includes at least two coupling sites proximate to the pivot axis, and at least two coupling sites spaced apart from the pivot axis in opposite directions.

8. The system of claim 1 wherein the support is configured to be fixedly attached to a bulkhead that is fixed relative to the refueling aircraft.

9. The system of claim 1 wherein the motion control device includes a forcing member positioned to urge the flexible communication link toward the support member.

10. The system of claim 1, further comprising the aerial refueling aircraft, and wherein the support is fixedly carried by the aerial refueling aircraft.

11. An aerial refueling system, comprising:

a support configured to be carried by an aerial refueling aircraft;

a movable aerial refueling boom positioned proximate to the support, the boom carrying an aerial refueling line;

a flexible communication link carried by the boom and movable with the boom relative to the support; and control means for controlling motion of the flexible communication link carried by the support, the control means limiting relative motion between the flexible communication link and the support, the control means including a conduit having a passage that receives hydraulic fluid, and further including; at least one of a mechanical spring, a hydraulic spring, and a pneumatic spring.

12. The system of claim 11 wherein the control means has a first coupling site and a movable second coupling site, and wherein the flexible communication link is attached to the second coupling site.

13. The system of claim 11 wherein the control means urges the communication link toward the support.

14. The system of claim 11 wherein the control means applies a tension to the communication link.

15. The system of claim 11, further comprising the refueling aircraft, and wherein the support is attached to the refueling aircraft.

16. A method for operating an aerial refueling system, comprising:

moving an aerial refueling boom carried by an aerial refueling aircraft relative to the aerial refueling aircraft;

moving a flexible communication link carried by the boom along with the boom as the boom moves relative to the aircraft, the flexible communication link including a hydraulic hose; and controlling a motion of the flexible communication link relative to the aircraft by applying a force on the flexible communication link separate from a force applied to move the boom to at least restrict contact between the flexible communication link and fixed portions of at least one of the aircraft and the boom.

17. The method of claim 16 wherein controlling a motion includes controlling a motion of a communication link configured to carry electromagnetic signals.

18. The method of claim 16 wherein controlling a motion includes urging the communication link toward a fixed portion of at least one of the boom and the aircraft.

19. The method of claim 16 wherein the communication link is coupled to a conduit and wherein controlling a motion includes rotating the conduit about a pivot axis.

20. The method of claim 1 wherein the flexible communication link is one of two flexible communication links, each of which includes a flexible hydraulic hose, and wherein controlling a motion of the flexible communication link includes urging a first one of the flexible hydraulic hoses toward a fixed portion of the aircraft in a first direction about a first axis, and urging a second one of the flexible hydraulic hoses toward the fixed portion of the aircraft in a second direction opposite the first direction about a second axis spaced apart from the first axis.

21. The method of claim 16 wherein the flexible communication link is one of two flexible communication links, each of which includes a flexible hydraulic hose, and wherein a first one of the flexible hydraulic hoses is coupled toward a first end of a generally rigid conduit and a second one of the flexible hydraulic hoses is coupled toward a second end of the generally rigid conduit, and wherein controlling a motion of the flexible communication link includes rotating the generally rigid conduit in a first direction by applying a tension on the second flexible hydraulic hose the boom rotates in the first direction, and rotating the generally rigid conduit in a second direction by applying a tension on the first flexible hydraulic hose opposite the first direction when the boom rotates in the second direction.

22. An aerial refueling system, comprising:

a support configured to be carried by an aerial refueling aircraft;

a motion control device carried by the support and includes a passage for receiving hydraulic fluid;

a movable aerial refueling boom positioned proximate to the support, the boom carrying an aerial refueling line; and a flexible communication link carried by the boom and movable with the boom relative to the support, the flexible communication link being configured to transmit electromagnetic signals and being coupled to the motion control device, wherein the motion control device limits relative motion between the flexible communication link and the support.

23. An aerial refueling system, comprising:

a support configured to be carried by an aerial refueling aircraft;

a motion control device carried by the support and including a generally rigid conduit that is pivotable relative to the support about a pivot axis, wherein the conduit includes at least two coupling sites proximate to the pivot axis, and at least two coupling sites spaced apart from the pivot axis in opposite directions;

a movable aerial refueling boom positioned proximate to the support, the boom carrying an aerial refueling line; and a flexible communication link carried by the boom and movable with the boom relative to the support, the flexible communication link being coupled to the motion control device, wherein the motion control device limits relative motion between the flexible communication link and the support.

24. A method for operating an aerial refueling system, comprising:

moving an aerial refueling boom carried by an aerial refueling aircraft relative to the aerial refueling aircraft;

moving a flexible communication link carried by the boom along with the boom as the boom moves relative to the aircraft, the flexible communication link being configured to carry electromagnetic signals; and controlling a motion of the flexible communication link relative to the aircraft by applying a force on the flexible communication link to at least restrict contact between the flexible communication link and fixed portions of at least one of the aircraft and the boom.

25. A method for operating an aerial refueling system, comprising:

moving an aerial refueling boom carried by an aerial refueling aircraft relative to the aerial refueling aircraft;

moving a flexible communication link carried by the boom along with the boom as the boom moves relative to the aircraft, the communication link being coupled to a conduit; and controlling a motion of the flexible communication link relative to the aircraft by rotating the conduit about a pivot axis and applying a force on the flexible communication link to at least restrict contact between the flexible communication link and fixed portions of at least one of the aircraft and the boom.

* * * * *

UNITED STATES PATENT AND TRADEMARK OFFICE
CERTIFICATE OF CORRECTION

| | | |
|---|---|---|
| PATENT NO. | : 7,309,047 B2 | Page 1 of 1 |
| APPLICATION NO. | : 11/067331 | |
| DATED | : December 18, 2007 | |
| INVENTOR(S) | : Crangle et al. | |

It is certified that error appears in the above-identified patent and that said Letters Patent is hereby corrected as shown below:

On page 2, in field (56), under "Other Publications", in column 2, line 2, delete "MotorpPress" and insert -- MotorPresse --, therefor.

On page 2, in field (56), under "Other Publications", in column 2, line 5, delete "Pheumatics," and insert -- Pneumatics, --, therefor.

In column 1, line 26, delete "The" and insert -- There --, therefor.

In column 8, line 26, in Claim 16, after "link" insert -- , --.

In column 8, line 27, in Claim 16, after "boom" insert -- , --.

In column 8, line 59, in Claim 21, after "hose" insert -- when --.

Signed and Sealed this

Nineteenth Day of August, 2008

JON W. DUDAS
*Director of the United States Patent and Trademark Office*